June 19, 1934.                W. H. PETIT ET AL              1,963,312
            METHOD OF AND APPARATUS FOR MAKING PHOTOGRAPHIC
                   RECORDS OF METER AND LIKE READINGS
                    Filed May 14, 1932        9 Sheets-Sheet 1
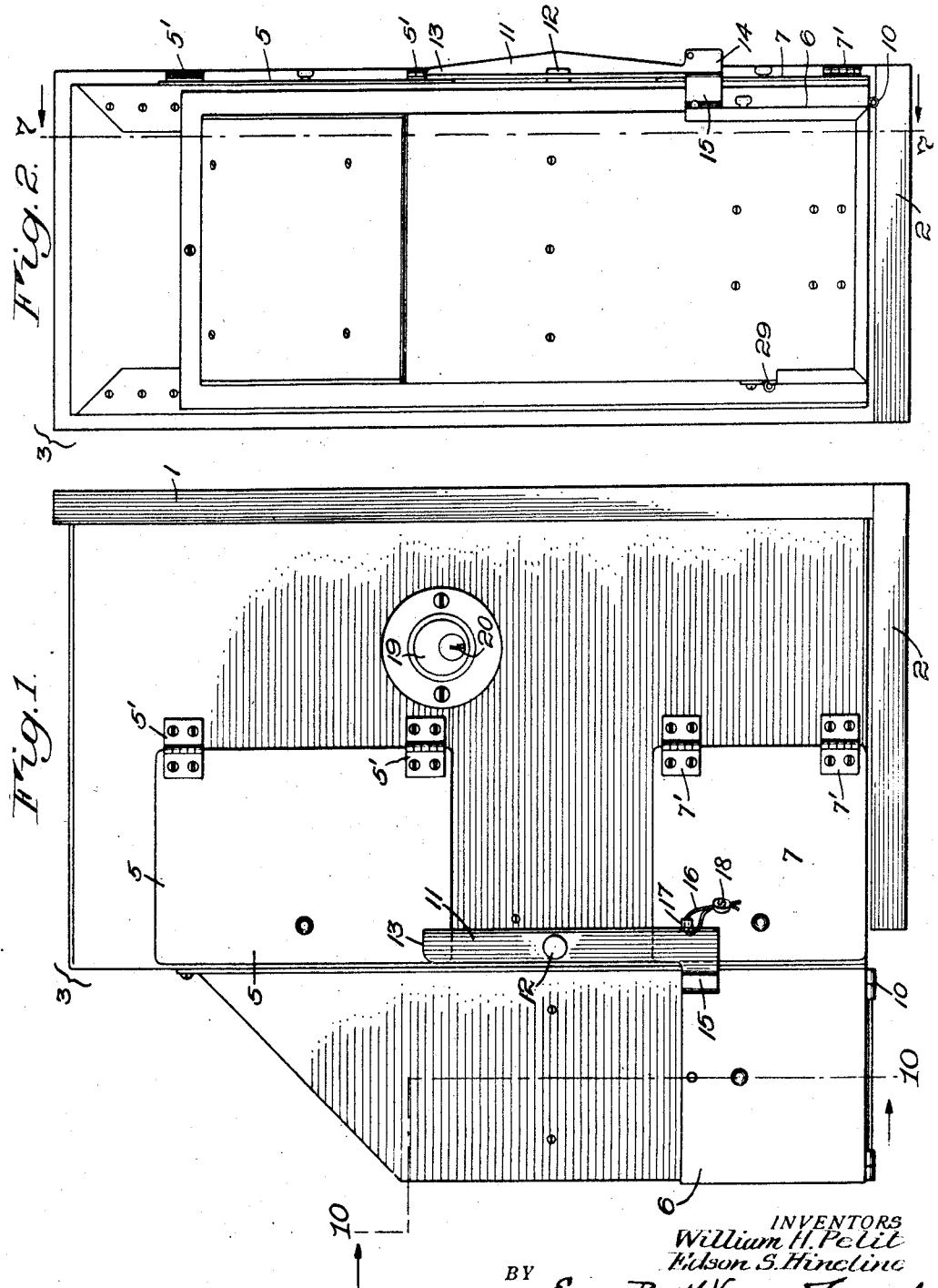

June 19, 1934.  W. H. PETIT ET AL  1,963,312
METHOD OF AND APPARATUS FOR MAKING PHOTOGRAPHIC
RECORDS OF METER AND LIKE READINGS
Filed May 14, 1932  9 Sheets-Sheet 2
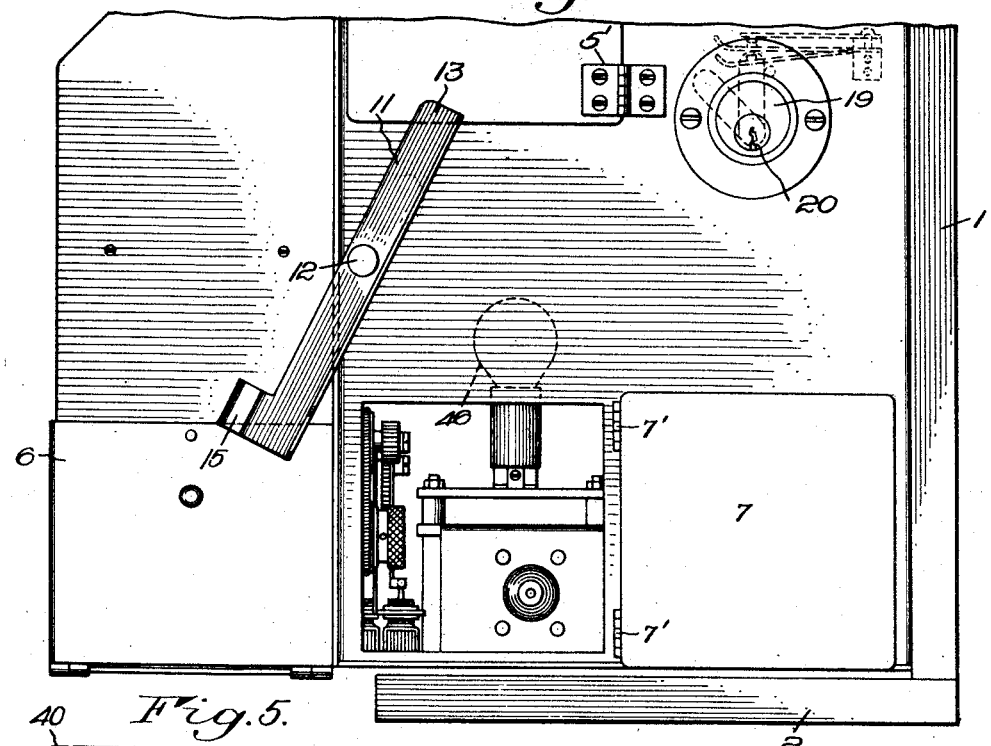
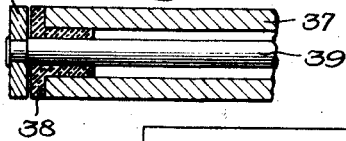
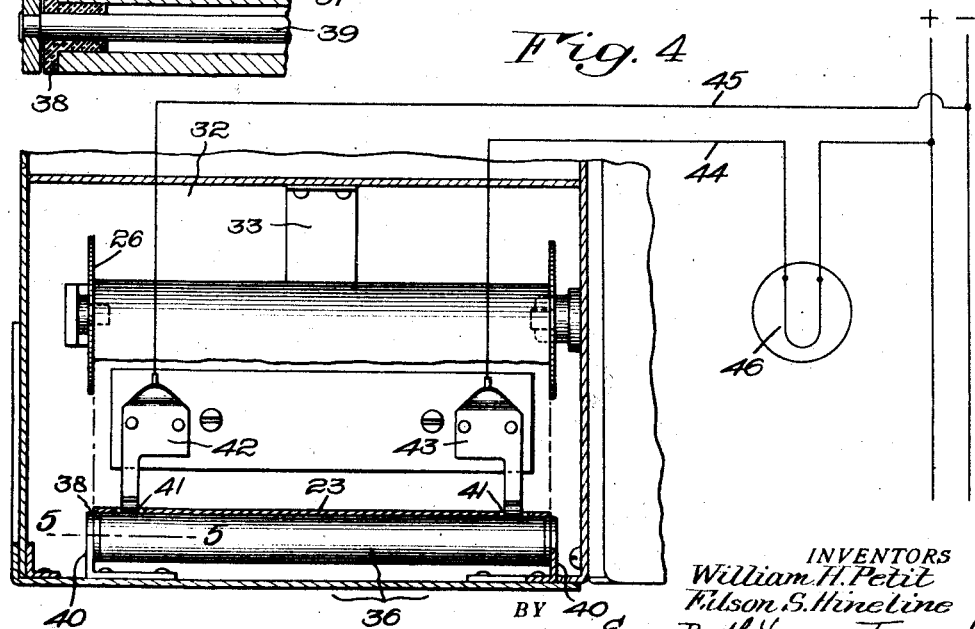
INVENTORS
William H. Petit
Filson S. Hineline
BY Emery, Booth, Varney & Townsend
their ATTORNEYS June 19, 1934.    W. H. PETIT ET AL    1,963,312
METHOD OF AND APPARATUS FOR MAKING PHOTOGRAPHIC
RECORDS OF METER AND LIKE READINGS
Filed May 14, 1932    9 Sheets-Sheet 3
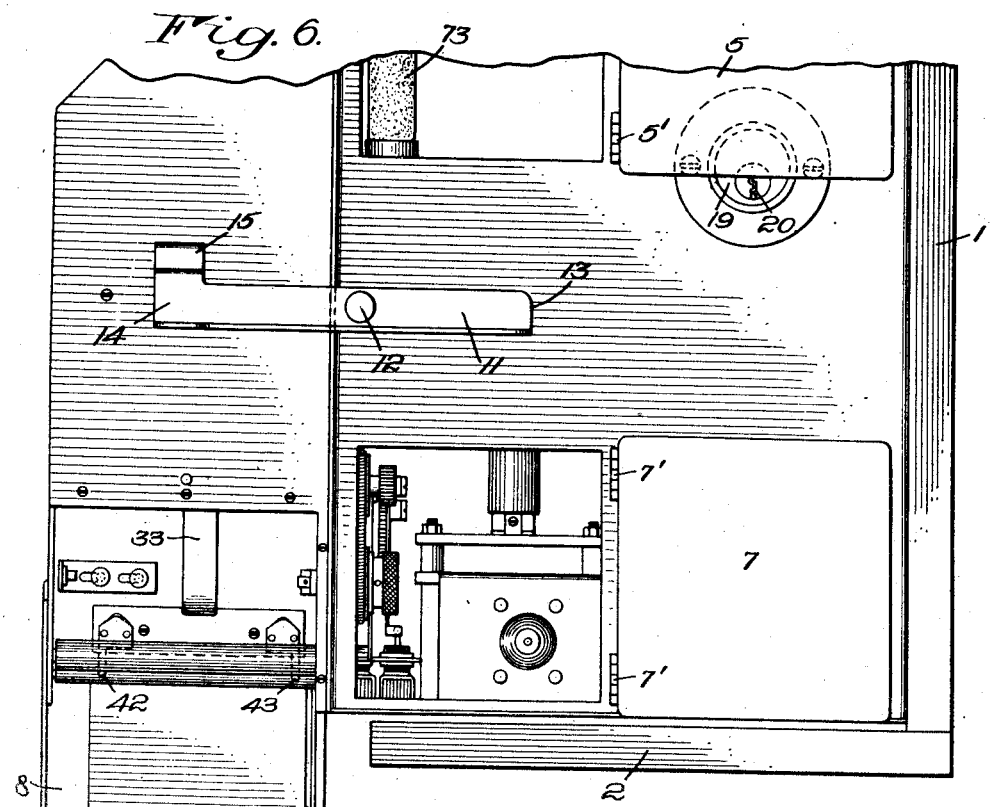
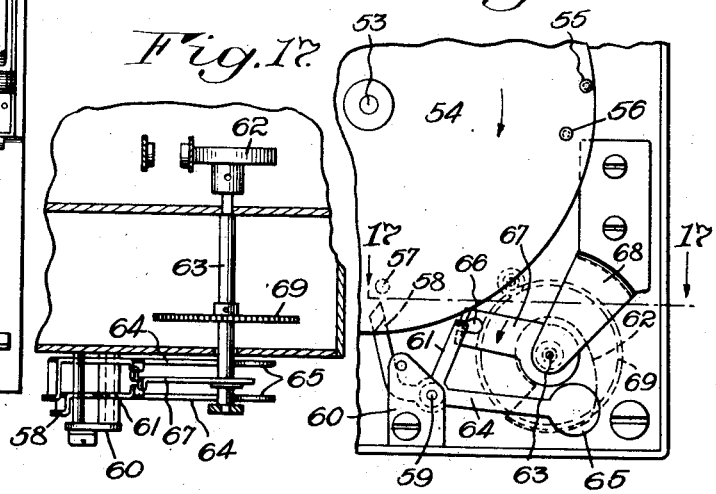
INVENTORS
William H. Petit
Edson S. Hincline
BY Emery, Booth, Varney & Townsend
their ATTORNEYS June 19, 1934. W. H. PETIT ET AL 1,963,312
METHOD OF AND APPARATUS FOR MAKING PHOTOGRAPHIC
RECORDS OF METER AND LIKE READINGS
Filed May 14, 1932 9 Sheets-Sheet 5

INVENTORS
William H. Petit
Kilson S. Hineline
BY Emery, Booth, Varney & Townsend
Their ATTORNEYS

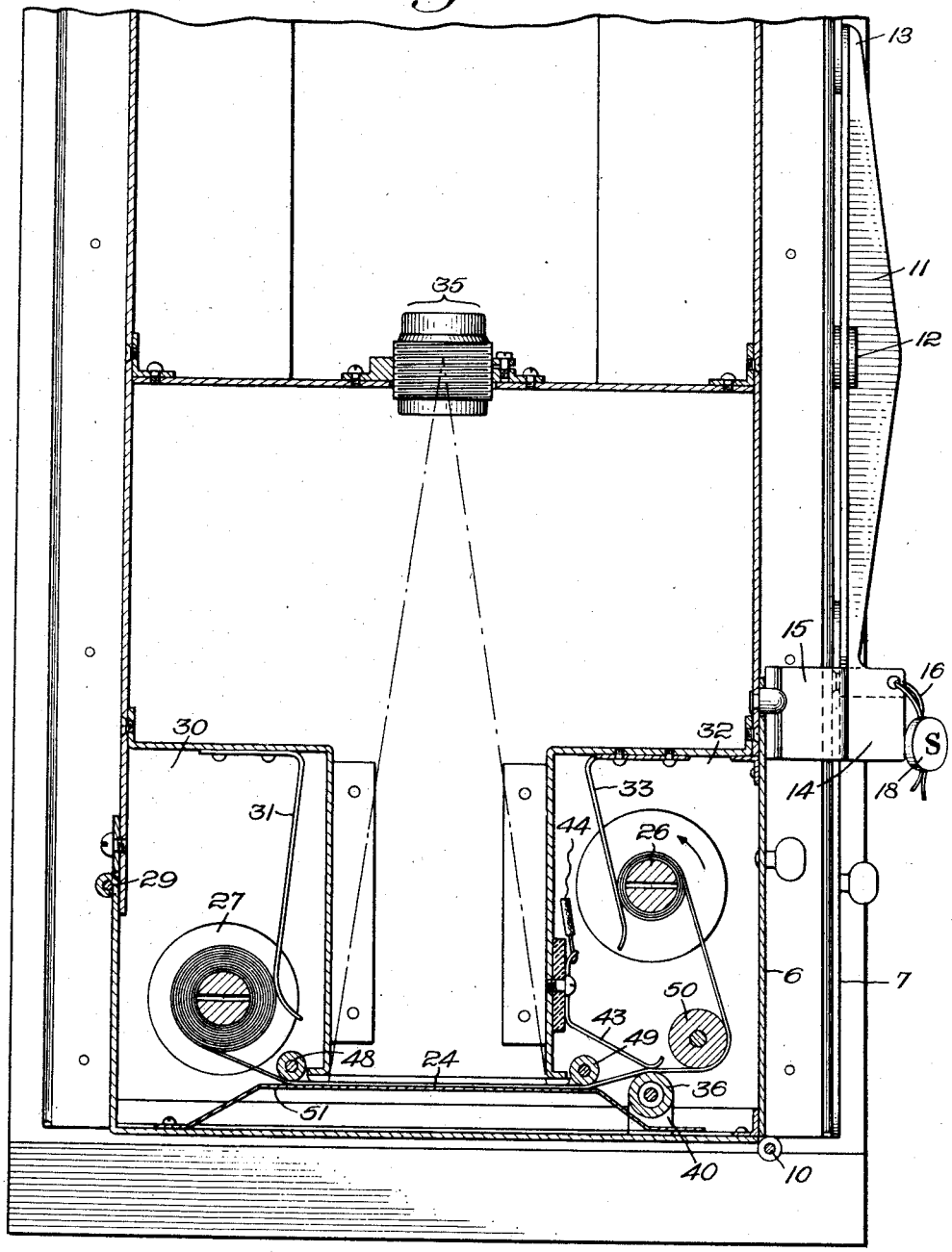

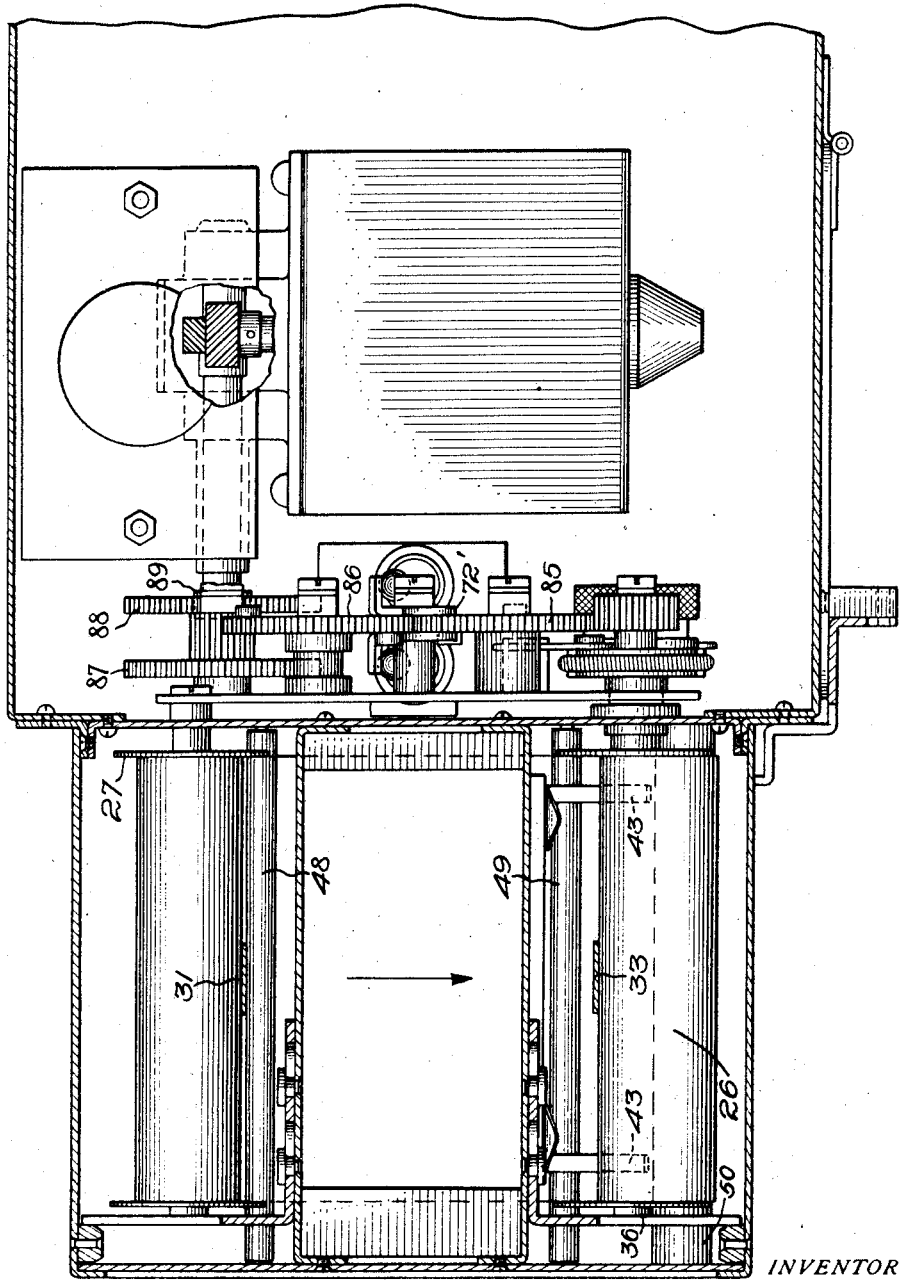

June 19, 1934.  W. H. PETIT ET AL  1,963,312
METHOD OF AND APPARATUS FOR MAKING PHOTOGRAPHIC
RECORDS OF METER AND LIKE READINGS
Filed May 14, 1932   9 Sheets-Sheet 8
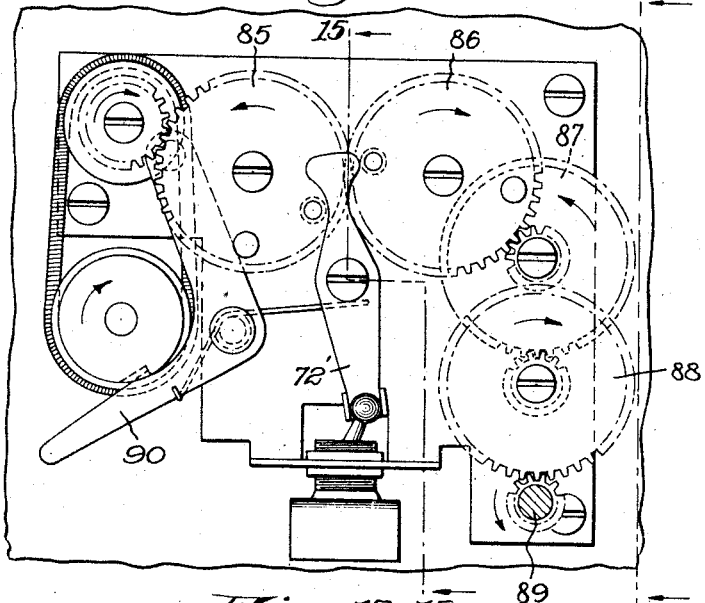
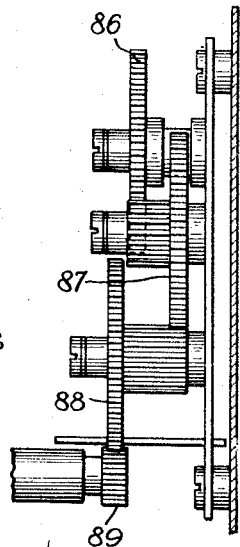
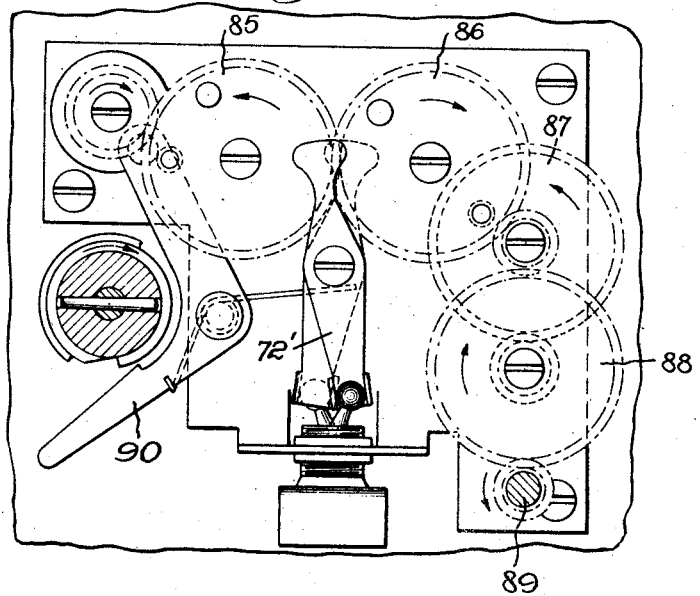
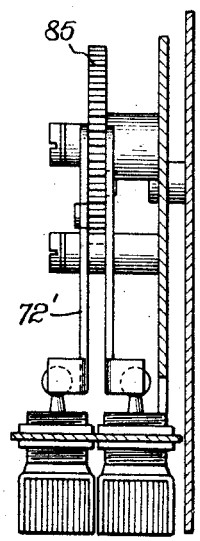
INVENTORS
William H. Petit
Edson S. Hineline
BY Emery, Booth, Varney & Townsend
their ATTORNEYS Patented June 19, 1934

1,963,312

UNITED STATES PATENT OFFICE 1,963,312

METHOD OF AND APPARATUS FOR MAKING PHOTOGRAPHIC RECORDS OF METER AND LIKE READINGS

William H. Petit and Edson S. Hineline, Rochester, N. Y., assignors to Folmer Graflex Corporation, Rochester, N. Y., a corporation of Delaware Application May 14, 1932, Serial No. 611,342

46 Claims. (Cl. 234—35)

This invention relates to a method of and apparatus for making photographic records of meter and like readings.

In order that the principle of the invention may be readily understood, we will describe the preferred embodiment of means for practicing the method and disclose one application of the method without in any wise limiting the invention thereto, which may obviously be applied to the making of photographic records of all types of meter reading devices, power gauges, electrical indicating devices, recorders and indicating means and many other uses.

In the drawings:

Fig. 1 is termed a front elevation of the photographic apparatus as it is viewed by an inspector or one authorized to insert and remove film strips;

Fig. 2 is a front end elevation of said apparatus as viewed by one looking against the wall upon which the demand meter is permanently secured;

Fig. 3 is a view of the lower portion of Fig. 1 upon an enlarged scale and showing one of the three doors open;

Fig. 4 is a view partly in transverse vertical section to show the film and its supporting means and also a part of the electric circuit;

Fig. 5 is a detail in longitudinal transverse section on the line 5—5 of Fig. 4;

Fig. 6 is a view similar to Fig. 3 but with all three of the doors open;

Fig. 10 is a transverse vertical section upon an enlarged scale on the irregular line 10—10 of Fig. 1 and looking toward the right in said figure;

Fig. 11 is a transverse horizontal section upon the irregular dotted line 11—11 of Fig. 7 and looking downwardly in said figure;

Fig. 12 is a detail in front elevation of the gearing directly associated with the cycle member and showing the mechanism in a neutral position;

Fig. 13 is a similar view of the part after the cycle member has partially completed its cycle.

Fig. 14 is a side elevation partly in section upon the line 14—14 of Fig. 12 and looking toward the left in said figure;

Fig. 15 is a view similar to Fig. 14 but taken upon the irregular dotted line 15—15 of Fig. 12 and looking toward the left in said figure;

Fig. 16 is a detail in front elevation with parts broken away showing a portion of the control disk and a portion of the control switch mechanism, which is itself controlled by such disk;

Fig. 17 is a detail in transverse section upon the line 17—17 of Fig. 16 looking in the direction of the arrows in said figure;

Figure 7:
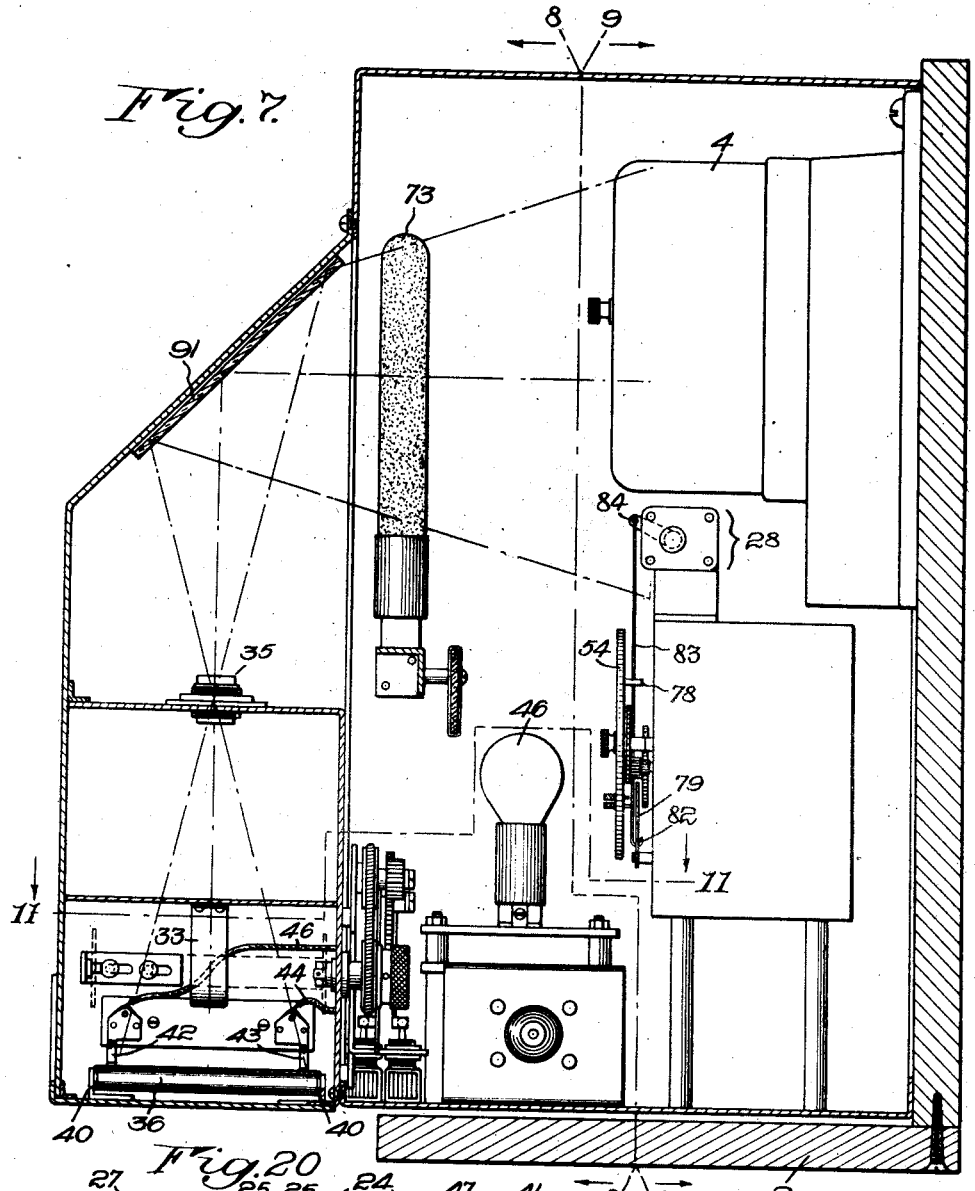
Fig. 7 is a vertical longitudinal section taken through the entire photographic apparatus, upon the line 7—7 of Fig. 2 and looking toward the left in said Fig. 2.

In a preceding application, Ser. No. 586,919, we disclosed a camera adapted for many uses, but particularly adapted for the making of photographic records of the reading of meters in telephone exchanges. Said camera was adapted to be held by the operator and shifted quickly from one group of meter readings to another until the entire series of meter readings had been photographed. The camera disclosed in that application was provided with a cycle controlling member which was caused to perform its cycle by the operator pressing a button or like part.

The present invention, while presenting certain features similar or analogous to those of the camera disclosed in said application, is peculiarly adapted to meet other wants although it is itself of wide application and may be employed for making photographic records of the readings or indications of all types of meter reading devices, power gauges, electrical indicating devices, recorders, weighing scales and other indicating means. We will proceed, however, to describe in detail one particular use of the apparatus and one adaptation of our method, but without in any way limiting the invention to such use or adaptation, and we will preface such description by an explanation of the difficulties under which, for example, companies which provide electrical power labor in securing correct and reliable information concerning the meter readings.

Companies or organizations which generate and distribute power, as, for example, electrical power or electricity for either power or light, install meters which, for example, may be demand meters, the readings of which are taken monthly by individuals whose duty is to look at the pointer of the meter and make note of the maximum or highest position to which the pointer has advanced during the month, and having made note of such position to restore the pointer to zero position. It is known that the financial losses of such companies are and have been very large running into many millions of dollars by reason of the practice of dishonest employees who, in making a note of the position of the finger of the meter, falsely record the lower position of the finger as though it were the maximum position. This is done with the knowledge of the consumer to whom a dishonestly smaller bill is rendered and the consumer and the dishonest reader of the meter divide the amount of which the company has been cheated by such proceeding.

It is the purpose of our invention to avoid all possibility of making dishonest returns of meter readings, and this we accomplish by automatically making a series of photographs of the meter readings or indications over a predetermined period of time, as, for example, daily for a month, or for such longer or shorter periods as may be desirable. Obviously instead of daily photographs, the same may be made at other intervals.

In accordance with our invention, in order to prevent all tampering with the meter or the indicating finger or other part thereof, as well as with the camera and its sensitized surface or film, we provide the camera with a casing or enclosure which is permanently secured in position over or about the meter or the face thereof, and the said casing or enclosure contains preferably not only the camera but a clock or time controlled element which will be automatically rewound as, for example, an electrically wound or spring motor clock. There is also preferably provided within the camera means for sequentially marking, and preferably for dating for each day of a month, each exposure substantially as the same is made and also for automatically causing the presentation of a fresh area of the sensitized surface or film. While the camera may within the scope of our invention be provided with a shutter, and while the shutter may be automatically opened and closed by the cycle controlling member, we preferably, and in accordance with the present disclosure, provide a shutterless lens or camera which is within, or the lens and sensitized surface of which are within, the dark chamber that is provided by the casing or enclosure. We provide lighting means within or for the said dark chamber, which lighting means is caused to function at predetermined periods throughout the entire period that the photographs are to be taken upon the sensitized surface or film.

In accordance with the preferred embodiment of the invention, therefore, the casing or enclosure provides or constitutes a dark chamber which is sealed or secured against access by any unauthorized person. The person authorized to do so inserts a film, as, for example, a film roll, in position in the camera, and within the enclosure are also provided the said lighting means, the clock or time controlled device, a motor, a dating mechanism and a governing member, such, for example, as a disk having formations thereon at intervals, which disk is rotated once in, say, twenty-four hours, so that at the proper time the motor will be started and thereupon the light will function, thereby making the exposure, the dating means will indicate the time of the exposure upon the proper sensitized area and the film will be fed sufficiently to present another area. It will be understood that after the fresh film has been inserted and the same is unwound sufficiently to take care of the paper or non-sensitized end, the casing or remaining opening therein is closed and the casing is sealed, so that it cannot be tampered with excepting by someone who would break the seal. If the seal were broken by someone during the monthly period (that is, while the film is only partially used), it will be evident that an exposure will be made upon that sensitized area which is then in position in line with the lens. Even if the one who thus tampered with the apparatus, then closed and resealed the same and it continued to function, it will be evident that one of the exposures would be an over-exposure or more correctly speaking a double exposure (namely, an exposure which was caused by tampering, which exposure is supplemented by the exposure of that same sensitized area made when the light next functions). Other safeguards against tampering will be fully set forth in the ensuing description wherein it will be set forth that means are provided whereby some duly authorized person who carries a key may cause an extra cycle of functions to occur upon a date known only to himself. Therefore, at the end of the month or other selected period, the film when taken out and developed will be found to have all of the thirty or other exposures, one for each day, and also somewhere along its length an additional exposure made by the person who was authorized to and did use the key for that purpose.

Having now described the purpose of the invention, we shall, without thereby limiting ourselves, proceed to describe the preferred embodiment of means for practising the invention and for carrying out the method of making photographic records.

Referring first to Figs. 1 to 10 inclusive, the wall or other support, upon which the demand meter or other element to be read is fixedly secured, is indicated at 1 in the several views, and is, particularly in Figs. 1, 2 and 3, represented as having also a horizontally extending shelf-like portion 2. The casing or enclosure for the photographic apparatus is represented generally at 3. It is adapted to receive all the parts of the apparatus and to house or enclose them, and to be itself permanently secured to the wall or support 1 and to house also the demand meter itself, indicated at 4 in Fig. 9. Said casing or enclosure 3, in this embodiment of the invention, therefore receives and permanently houses not only the demand meter itself but also an electric motor connected at all times with the power supply and serving to keep the clock or time element within the casing wound at all times. Within the casing is also provided a red light for a purpose to be described and a white light by means of which exposures are periodically made, together with a counter or dating mechanism and the sensitized surface or surfaces, preferably in the form of a sensitized roll which is automatically unwound step by step, as, for example, one step for each twenty-four hours throughout a thirty day period.

While the casing 3 may be of any suitable shape and of any suitable material, it is preferably of metal and is represented most clearly in Figs. 1, 2, 6 and 7 as having three doors 5, 6, 7, the doors 5 and 7 being hung upon vertically arranged hinges 5', 5' and 7', 7' respectively, and the door 6 being formed of two parts 8, 9 hinged together as indicated in Figs. 2 and 6 at 10 and adapted to be closed into the position indicated in Figs. 1 and 2.

It will be observed that in this embodiment of the invention, we provide a single member adapted to overlie and hold closed all three doors 5, 6, 7, which member may then be sealed or locked in closed position. As herein shown, said securing member is in the form of a lever 11 pivoted at 12. The end 13 of said lever overlies the lower end of the door 5, thereby holding the same closed. The opposite end 14 of said lever overlies and holds closed the door 7 and an offset or angled part 15 at the lower end of said lever 11 overlies the door 6 and holds that closed. Said lever 11 may be sealed or locked in closed position by any suitable means, as, for example, by a wire 16 which is placed through a flange on the lever 11 and a lug or projection 17 on the door 7, whereupon the two ends of the wire 16 are brought together and pass through the lead or like seal 18, most clearly shown in Figs. 1 and 10.

In the front face of the casing or enclosure is a member or part 19, shown most clearly in Fig. 1, into an opening 20 in which is adapted to be inserted a key that is carried by an inspector or other authorized person, and who may, in order to cause an additional exposure upon the film, insert the key through the opening 20, so as to close a shunt or other circuit and operate the cycle mechanism as will be explained.

Figure 9:
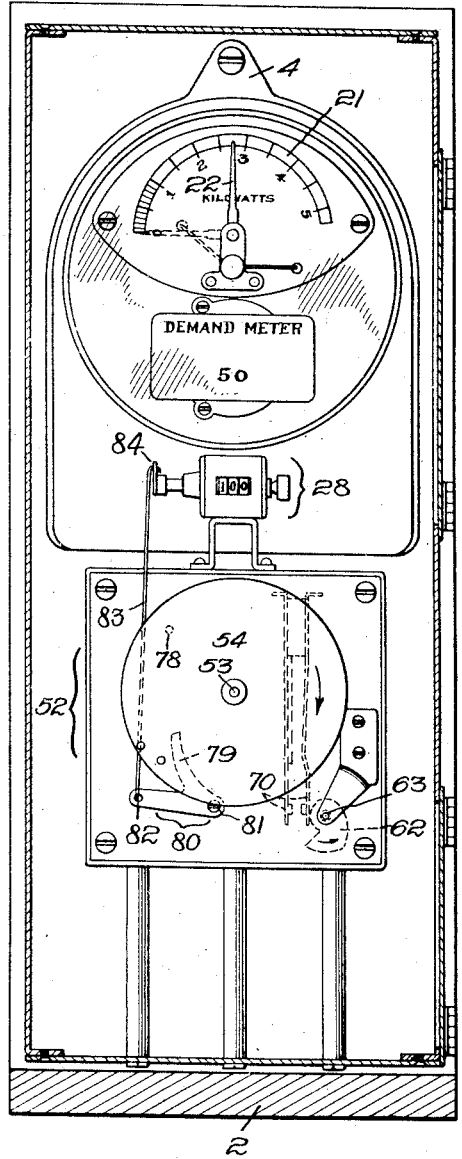
Fig. 9 is a similar section upon the line 9—9 of Fig. 7 and looking toward the right in said Fig. 7.

The demand meter indicated generally at 4 in Fig. 9 has a dial 21 along the face of which in a clockwise direction moves the finger 22. Said finger indicates, in this adaptation of the invention, the maximum kilowatts used at any time during the monthly period for which the meter is customarily read. Said finger 22 properly moves only in a forward or clockwise direction, and the reading which is taken should be, for example, that shown in Fig. 9, assuming that it is the last day of the month or the day upon which the periodic reading is taken.

Heretofore dishonest readers who are in collusion with the users of electrical power, have been able before making the reading so to manipulate the finger 22, or even to substitute another finger therefor, as to cause said finger to indicate a lower maximum and the fictitious saving as indicated has been divided between the dishonest meter reader and the customer.

This procedure is impossible in the practice of our invention, inasmuch as a photographic record is periodically made, as, for example, once a day, directly from the face of the demand meter upon the sensitized strip which, as described, is caused to move once daily to present a fresh sensitized surface.

Figure 20:
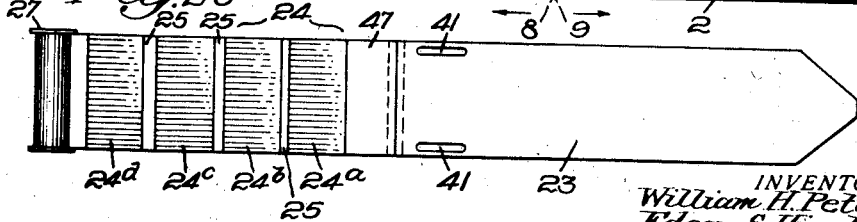
Fig. 20 is a plan view of the leading end of the sensitized strip having the non-sensitized leader end.
Figure 8:
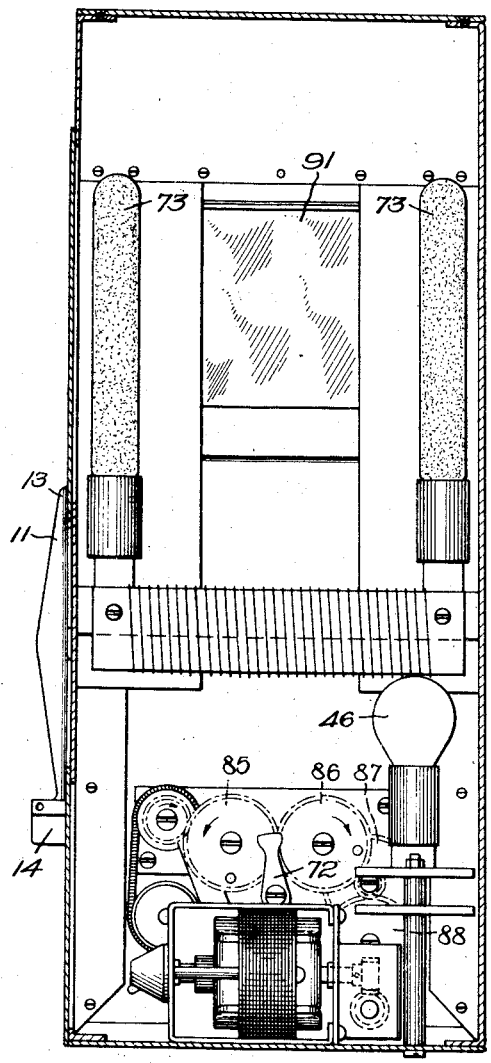
Fig. 8 is a vertical transverse section upon the irregular dotted line 8—8 of Fig. 7 and looking toward the left in said Fig. 7.
Figure 18:
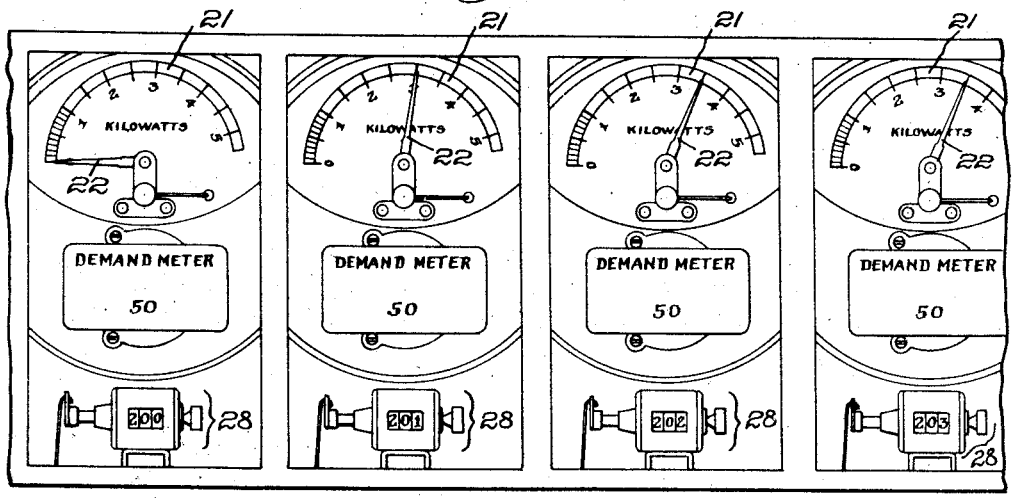
Fig. 18 is a plan view (substantially full size) of a portion of the film strip showing the exposures thereon as they appear after development.

Portions of the film are indicated in Figs. 18 and 20. The leader or non-sensitized end of the strip is indicated at 23, and the sensitized portion is indicated generally at 24 in Fig. 20, where are shown four different picture areas 24a, 24b, 24c and 24d. It will be observed that the interval 25 between the picture areas progressively increases as the sensitized surfaces advance. This is due to the increasing diameter of the take-up roll 26, shown most clearly in Fig. 10. Within the purpose of our invention means may be provided to control or compensate the rate of feed in such manner that there is an equal spacing between the picture areas, but in practice it has been found unnecessary to do this inasmuch as the film strip is intentionally made of such length as to receive the thirty or thirty-one daily pictures during the month as well as an extra picture to be taken by the inspector upon insertion of his key, as described, and also about three additional exposures. There would not be sufficient saving of film in this embodiment of the invention to warrant the cost of providing means to feed the film strip in such manner as to equalize the intervals between the picture areas, but to do so would be within the scope of our invention. The film strip is mounted upon a spool 27, shown most clearly in Fig. 10, and the same is placed in position by the person who at the end of the month or other period removes the exposed film.

In Fig. 18, an intermediate portion of the strip appears with the developed exposures thereon. It will be observed that upon each exposure area appears a representation of the face of the meter with a representation of the pointer 22 which (viewing Fig. 18) may be assumed to be in its zero position, at which time the reading of the dating indication or the counter or other indicator 28 is at 200. Upon the successive exposures there is shown a reading at the dating indication or the counter of 201, 202, 203, thus showing that the readings have been consecutive. Instead of the readings by number, there may be a reading by dates, for which purpose it is merely necessary to use a suitable dating indication or mechanism which would be within the purview of our invention. Fig. 18 shows that the second exposure of the demand meter gives the position of the finger 22 at 3 upon the dial 21, thus showing that upon the second or next day the maximum kilowatts has advanced or increased to three. The third exposure shows that upon the next day the finger 22 has advanced to a position half way between the figures 3 and 4 on the dial, and the next exposure, which is number 203, indicates the same maximum as for the just preceding exposure.

As already explained, the exposures are automatically repeated, preferably for thirty days. Preferably the film is advanced one step or picture area immediately after an exposure has been made and the same has been marked by dating or other indication. Inasmuch as preferably the camera has no shutter, it will be understood that if a dishonest meter reader or some other person should during the month attempt to set the meter finger 22 back, as to zero, he would first have to break the seal 18 and open the upper door 5 which gives access to the demand meter. This act would admit enough light into the dark chamber, which is provided by the cover or enclosure 3, to register an impression on that portion of the sensitized element or film strip that is in position immediately in front of the demand meter. Even if the door 5 were then closed and resealed, upon the next operation or cycle of operation by which an exposure is made, it will be evident that such exposure would be on the same portion of the film or sensitized surface upon which an exposure was made when the apparatus was tampered with by opening the door 5. Thereupon such picture area would have thereon an over-exposed impression or double exposure that would be immediately recognized as due to tampering of the apparatus. Such over-exposed impression or double exposure would, in the usual course of business, come to the attention of the Public Service Commission that receives the meter readings and inspects the same.

Referring more particularly to Fig. 10, it will be observed that the point at which the door 6 is hinged to the casing is indicated at 29 in Figs. 2 and 10. This construction of a two-part door 6 permits the entire lower outer end of the casing to be opened, thereby affording access to the film roll after the same has been completely exposed and readily permitting the insertion of a fresh roll. As shown most clearly in Fig. 10, the spool 27 is mounted in a chamber 30 provided with a tension spring 31 to bear against the non-sensitized surface of the film, and the take-up spool 26 is mounted in a chamber 32 provided with a similar tension spring 33. Between the two chambers 30 and 32 is provided the chamber 34 across the lower end of which the film travels as indicated at 24 in Fig. 10, where the same is shown as exposed to the demand meter 4 through the lens 35. The main part of the door 6 carries a contact roll 36 which, when the door 6 is closed, engages the non-sensitized face of the strip, as shown also in Fig. 4. The said roll 36 which is provided with a metallic portion or cylinder member 37 is provided at its ends with insulated bearings, one of which is shown at 38 in Fig. 5. The axle or axial pin 39 for the roll 37 is supported in suitable brackets 40.

As indicated in Fig. 20, the leader end 23 of the film is provided with two slots 41, and those slots are so positioned with respect to the edges of the film and with respect to the first picture area that when the new film has been placed in position and the strip has been unwound at the leader end far enough nearly to bring the first picture area in front of the lens, the contact members 42, 43 (shown most clearly in Figs. 4 and 7 and one of which is shown in Fig. 10) enter the openings 41 and thus complete a shunt circuit through the wires 44, 45, and the red lamp 46, so that the red light indicates that the leader end of the film has been sufficiently unwound to bring a portion 47 thereof in front of the lens. Such portion 47 is, as shown in Fig. 20, just in advance of the first picture area 24a, and as at this time the closure has been made light-tight by the closure of all the doors (the last of which to be closed is the door 7), the parts are now in condition for the automatic periodic feeding of the film.

The said film, as shown in Fig. 10, between the rolls 26, 27, passes under small guide rolls 48, 49 and about a guide roll 50. Desirably the said door 6 is provided with a supporting portion 51 along which the film is moved as described and serving to support the picture area of the film in smooth condition.

Desirably positioned within the casing 3 is a clock or time element. In the disclosed embodiment of the invention the same is indicated in its entirety at 52 in Fig. 9. It is there shown as mounted under the demand meter. It is at all times connected with the power supply or source of electricity, and therefore serves to keep the clock wound at all times. The said clock mechanism is provided with a shaft 53, shown most clearly in Figs. 9 and 16, and upon said shaft is fixedly mounted the control disk 54 which, in the disclosed embodiment of the invention, is turned one complete revolution each twenty-four hours. Desirably the surface of the disk 54 near its perimeter is provided with closely spaced apertures extending entirely about the disk, so that pins may be positioned at any desired intervals so as to control the function or operation of the motor starting switch 70 which controls the starting of the cycle member driving motor. The dating or numbering may be controlled either by the control disk or by the motor driven cycle member, being in this embodiment of the invention, however, controlled by the control disk. In the disclosed embodiment we have represented two pins 55, 56, which are positioned close together and at different radial distances from the shaft 53, and there is also indicated by dotted lines a third pin 57. The purpose of these pins will be stated more fully.

The pins 55, 56 function as follows: The pin 56 which is further from the periphery of the control disk 54, as the same turns in a clockwise direction, engages the arm or dog 58 constituting a part of a three pronged member pivoted at 59 in a suitable bracket 60. The onward movement of the disk 54 causes the pin 56 to swing the dog or arm 58 downward and outward viewing Fig. 16 and to bring the second dog or arm 61 upward and inward into the path of the second pin 55 and moves the same so that a cam 62 upon a cam shaft 63 is released or permitted to commence its function. The lever structure mounted at 59 is provided with a third arm 64 weighted at its end 65 to return the dog to the position shown in Fig. 16. The purpose of the said cam is in such respect the same as the manually operated switch in our previous application Ser. No. 586,919.

The dog or arm 61 in the position shown in Fig. 16 engages a recess or notch 66 in an arm 67 pivoted upon the cam shaft 63, which shaft is suitably mounted in a bracket 68. When the arm 67 is released from the dog 61, the cam shaft is permitted, under the control of the gearing including the gear wheel 69, to rotate. In the rotation of the said cam shaft 63 carrying its cam 62, the cam closes a circuit, the contact members of which are indicated at 70, Figs. 9 and 19. Said circuit is closed for a time which is shorter than the period of time necessary for a complete cycle, which, for example, might be for a duration of not over three seconds, during which time the motor driven cycle member including gears 85, 86, has begun to function, but it is to be understood that the time depends entirely upon the entire period of time for the cycle.

Figure 19:
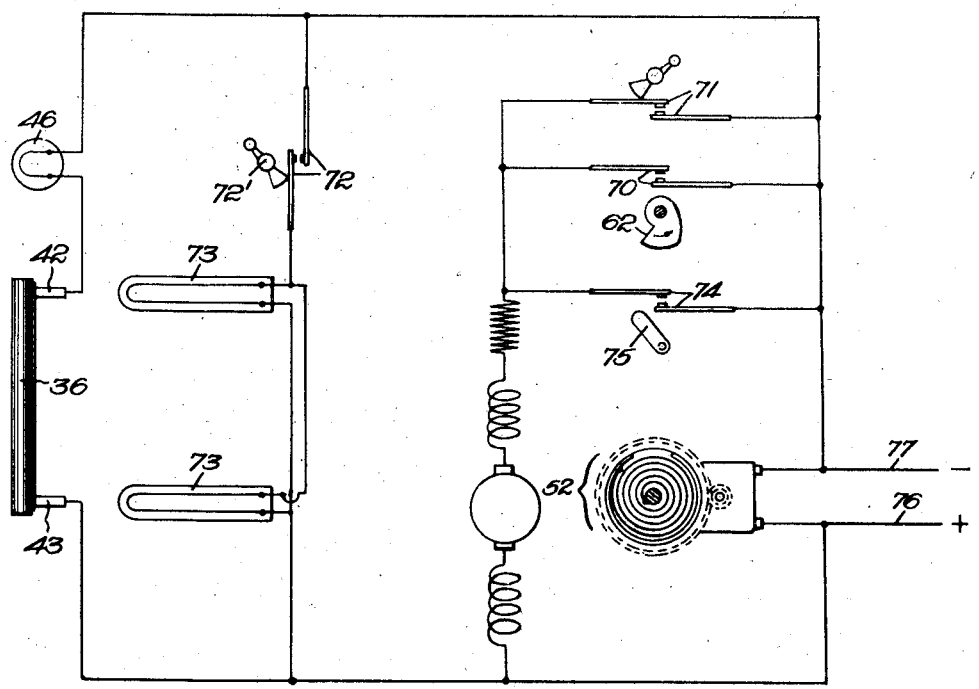
Fig. 19 is a diagrammatic view of the electric circuits which control the exposure or light switch, the motor switch upon the cycle member, the clock switch or starter, and also the key control switch.

The motor switch on the cycle member, which is indicated at 71 in Fig. 19, is closed slightly after the said closing of the clock switch starter. Then the light switch indicated at 72 in Fig. 19 is closed, causing the white lights 73, 73, Figs. 7, 8 and 9, to flash, thereby making an exposure. By this time, the cam 62 that closed the clock switch has returned to its initial position ready for another operation. Inasmuch as the control disk 54 moves very slowly, we have used the mechanism herein disclosed, but our invention is in no wise limited thereto inasmuch as any other suitable mechanism may be used for the purpose. The cam shaft 63 is desirably provided with differential gearing so that the said cam shaft is given a relatively fast movement of rotation.

Desirably the dwell of the cam on the clock switch occupies three seconds and the time of exposure occupies two seconds. The time of rotation of the cycle member in this embodiment of the invention occupies twelve seconds.

After the cycle member has completed its circuit, which is shown in detail in Fig. 19, another twenty-four hours or other predetermined period goes by before the several mechanisms are again put in operation unless an inspector having possession of a key, as stated, inserts the same in the opening 20 in Fig. 1 in the outer wall of the casing or enclosure and causes an additional functioning of the mechanism. Such key controlled switch is indicated at 74 in Fig. 19, where is shown a cam or arm 75 that is turned by the inserted key, causing the circuit to be closed and causing the cycle member to effect the additional exposure by flashing the white lights and the feeding of the film one step for the next exposure.

In Fig. 19 is diagrammatically shown the electric circuit. The connections to the main circuit are indicated by the wires 76, 77, and the current carried thereby serves to keep the clock mechanism 52 constantly wound. Within said circuits and the described shunt circuits are included the several switches as described and as illustrated in Fig. 19, and by which the several parts are caused to perform their functions. This includes the contact members 42, 43 by means of which the red light is flashed just prior to the positioning of the first picture area in front of the lens; the exposure or light switch 72 causing the flashing of the white lights 73, the clock switch or starter 70 operated by cam 62, the motor switch on the cycle member as indicated at 71, and the key control switch as indicated at 74, 75.

In addition to the foregoing, there is also controlled by the control disk the counter 28. This is accomplished by a pin 78, shown in Figs. 7 and 9 as upon the inner face of the control disk 54. In the rotation of the latter the pin engages the arm 79 of a lever 80 pivoted at 81 and having connected to its end at 82 a wire or link 83 connected to an arm 84 upon the shaft of the meter 28.

The gearing for rotating the cycle member is represented in detail in Figs. 12 to 15 inclusive. It is unnecessary to refer to the same in detail. There are provided the several gears 85, 86, 87, 88 and pinion 89, with pinions upon the shafts of said gears. As already stated, Fig. 12 indicates the mechanism in neutral position (i. e. while the cycle member is not rotating), and in Fig. 13 the parts are represented as though the cycle member had commenced a functioning movement, the switch member 72' or the lamp switch (shown in Figs. 12, 13 and in the diagrammatic illustration Fig. 19) having, in Fig. 13, been actuated and returned to its initial position. The means for feeding the film in a step by step manner is included in the representation in Figs. 12 to 15. Without describing the same in unnecessary detail, it is noted that the film locking dog is represented at 90, it being shown in its locking position in Fig. 12, and in released position in Fig. 13, at whch latter time the sensitized film or element is being drawn forward to present an unexposed area for the next operation or exposure. Referring to Fig. 7, it is to be noted that, in a manner characteristic of the well known Graflex camera, the photographic apparatus herein represented is provided with a mirror indicated at 91, whereby the readings of the meter are reflected through the lens onto the film in an upright position.

In making use of the photographic apparatus herein described, the three doors 5, 6, 7 are all opened by unsealing the seal 16, 18, and turning the member 19 in a clockwise direction sufficiently to uncover all the said doors. Through the lower left hand door 6 (viewing Fig. 1) the used film may be removed and a new film substituted. Thereupon the doors 5 and 6 are closed, these being the doors through which access is afforded to the lights and to the film or sensitized element. The key which is adapted to be inserted in the opening 20 is then inserted and is turned and left in position until the red light 46 flashes, thereby showing that the film is in position for starting the series of exposures. Then the lower door 7 is closed and the member 11 turned into the position shown in Fig. 1 and the sealing wire 16 is placed in position and its ends sealed as indicated in Fig. 1.

By closing the said doors the casing is made to constitute a dark chamber. Thereupon the automatic photographing of the meter readings commences and continues as long as the film lasts (in the present instance there being enough film for thirty-five exposures).

It will be understood that the so-called key switch herein disclosed corresponds in general function to the provision of a button in our co-pending application Ser. No. 586,919. The said key is employed to unwind the leader end of the film and thereafter the key is to be used only by some authorized person to make an additional exposure at some unannounced time and by which a check upon the entire apparatus is provided. Instead of the key there may be other provisions constituting a check upon the apparatus.

In the functioning of the cycle member, the white lights 73 are caused to flash and thereby to make the exposure, inasmuch as the lens is not provided with a shutter. Then the white lights go out and the film is wound another step so as to provide for the next exposure. Then the motor is caused to stop and does not recommence to turn or function until the commencement of the next time cycle.

It is unnecessary to provide any telltale to show that the film is actually exhausted, but the red light does in fact flash and so indicates, although since the casing is sealed, this is not visible to the observer.

It is not vital to the performance or practice of the invention that the film make all the exposures thereon, since a few only will do. There must, however, be no fogging or over-exposure because the existence thereof would show that the apparatus had been tampered with. Therefore the provision of a shutterless lens effects a novel and important result in the combination, in that tampering with the casing causes an exposure upon the waiting area of the film.

Preferably the film employed in the use of the apparatus is the same as that in our co-pending application Ser. No. 715,107, but the openings in the film are desirably only at the leading end thereof. When the time arrives to unload the photographic apparatus (that is, to remove the exposed film) the so-called red paper of the film is entirely wound over the sensitized portion of the film in the same manner as in starting the film, that is, the door 7 only is opened and the key switch is operated until the red light flashes indicating that the film is completely wound up.

It will be understood that the apparatus provides a number of different checks. If the casing or enclosure is tampered with, there results an over-exposure of one section or area of the film because the film would not be turned or moved between the time of the tampering and the next exposure. If a dishonest meter reader set the meter back, the next exposure of the film would indicate that he had done so because said next exposure would be lower than the next previous reading. Moreover the portion of the film that is exposed would be dated or marked in sequence and would show the date on which the tampering occurred. Any backward variation of the meter would show that it had been tampered with, this being evident by a comparison with the next previous exposure. The key check as described permits a supervisor to make his rounds upon some secret or unexpected day and to turn the key to cause the camera to go through one cycle of operation, thus making one extra exposure for that day, the presence of which exposure on the film when developed shows that that film is genuine.

It will be understood that in the use of meters such as here referred to, the rate of payment is based on the maximum demand, as, for example, so much per kilowatt. The films which are exposed in accordance with this invention are presented to the Public Service Commission or some like authority.

Obviously the invention may be put to a great variety of uses, as, for example, in photographing any reading or indication where time or quantity is an element, and time and quantity may be employed as the controlling means to operate the camera.

The problem to be met prior to the present invention was the provision of means for photographing a meter or other reading, which means could not be tampered with. Such photographic means must remain in position enclosing the meter or at least the face thereof, so that the photographic means will automatically take pictures at intervals and will preserve those pictures in such a way that those pictures cannot be abstracted by any person not having proper access and whereby false pictures cannot be substituted. In many states, it is a state prison offense to tamper with a meter reading, but it is an easy matter for a person to move back the hand on the dial, which hand indicates the maximum demand. Therefore, the dial must be enclosed so that it will be impossible to get at it in any way except by leaving an absolute indication that the dial or the photographs have been surreptitiously altered.

The foregoing problems are met, in this embodiment of the invention by providing a clock which is automatically and electrically rewound, which clock turns a control disk preferably once in twenty-four hours and has thereon pins or other formations to control certain functions, including the starting of the cycle member and the dating means. Inasmuch as no shutter is provided, if the casing be opened at any time when the film is not fully wound, light gets to that film, and this results in defects as already fully explained. The key by which the additional functioning of the photographic apparatus is caused, provides the final safeguard.

Our invention also comprehends and includes photographic means for obtaining the reading of a combined total watt hour consumption and maximum demand meter. Such reading is obtained through the use of a regular watt hour meter, and the photographic apparatus herein disclosed, so arranged as to give a series of fifteen or thirty minute readings (or other short time interval) instead of daily readings, and arranged to carry the greater length of film necessary which might, for example, be up to ninety feet.

The means for accomplishing this result functions as follows: Each picture (taken, for example, at fifteen minute intervals) records the total consumption in kilowatt hours or fractions thereof. Therefore the difference between any two consecutive readings would give the kilowatts or fractions thereof consumed in that period, which can thus be interpreted as the maximum demand for that like period.

The regular watt meter herein referred to is the meter installed by all electric light and power companies for recording the total number of kilowatts consumed instead of, as in a demand meter, recording the maximum demand for a given period, such as a month. In such a demand meter, if on any day there is a greater demand than on a previous day, this is shown by the forward movement of the hand or pointer. In a watt hour meter, on the contrary, the total consumption is shown, the last reading being the total consumption, and if there has been a previous reading, that previous reading is subtracted to get the new reading.

The apparatus of such form or embodiment of our invention, therefore, includes a watt hour meter; a clock such as herein shown or of other type, having means for tripping the operating mechanism at fifteen or thirty minute intervals (or the like); means for winding the film a step after each exposure, or otherwise presenting an unexposed picture area; means for illuminating the dial to cause the exposure to take place; a calendar or device to be advanced daily by the clock mechanism so as to indicate the day the readings are respectively made; a film positioning device to show when the film is in position for first exposure and to indicate when all the film has been wound up; and a casing or housing to enclose the watt hour meter camera mechanism and all the parts associated therewithin, to be sealed with one seal.

Having thus described one illustrative embodiment of the invention and the best mode known to us for carrying out the method of our invention, it is to be understood that although specific terms are employed, they are used in a generic and descriptive sense, and not for purposes of limitation, the scope of the invention being set forth in the following claims.

We claim:

1. That method of making photographic records of meter and like readings or indications, and preventing tampering with the meter, its readings and/or the said photographic records, which comprises the following steps: sufficiently enclosing together against tampering, the meter and photograph apparatus to constitute or provide a dark chamber with said apparatus in record making condition; signaling that the sensitized strip is in position for the sealing operation; then sealing the enclosure for the period required for the entire series of sequential exposures; periodically presenting to said meter reading an unexposed sensitive surface; preventing exposure of said sensitive surface only by preserving the darkness of said chamber whereby tampering would be detected at any time; periodically lighting the dark chamber to make the exposure upon said sensitive surface; presenting another unexposed sensitive surface and repeating the preceding sequence of operations at substantial intervals until a series of sequential photographic records has been automatically made within said dark chamber, all while the same and the meter and said photographic apparatus have continued to be enclosed against tampering, and unsealing the enclosure at the end of the said period.

2. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; automatically signaling that the sensitized strip is positioned for starting the series of exposures; periodically presenting to said meter reading an unexposed sensitive surface; preventing exposure of said sensitive surface only by preserving the darkness of said chamber whereby tampering would be detected at any time; periodically lighting the dark chamber; presenting another unexposed sensitive surface and repeating the preceding sequence of operations at substantial intervals until a series of sequential photographic records has been automatically made within said dark chamber, all while the same and the meter and said photographic apparatus have continued enclosed against tampering.

3. A mechanical assembly for making photographic records of meter and like readings or indications, and for preventing tampering with the meter, its reading, and/or the said photographic records, which includes the following: a meter which presents readings or indications; a photographic apparatus including a lens; a casing or enclosure for the photographic apparatus and meter, providing a dark chamber; lighting means within the chamber; means to support within the casing or enclosure a sensitive surface of sufficient extent to provide a series of exposure areas; means automatically to present periodically a fresh area of said sensitive surface; means to prevent exposure of said sensitive surface only by preserving the darkness of said chamber whereby tampering would be detected at any time; and means periodically to cause said lighting means to function.

4. A mechanical assembly for making photographic records of meter and like readings or indications, and for preventing tampering with the meter, its reading, and/or the said photographic records, which includes the following: a meter which presents readings or indications; a photographic apparatus including a shutterless lens; a casing or enclosure for the photographic apparatus and meter, providing a dark chamber; lighting means within the chamber; means to support within the casing or enclosure a sensitive surface of sufficient extent to provide a series of exposure areas; means automatically to present periodically a fresh area of said sensitive surface; and means periodically to cause said lighting means to function.

5. In a photographic apparatus, the combination of a casing, means for sealing said casing, a demand meter within said casing, a counter, a clock mechanism and a sensitized element for receiving impressions of the meter and the counter, exposure means and means for automatically advancing the sensitized element for subsequent impression at desired intervals.

6. In an automatic photographic apparatus, the combination with a casing, means for sealing said casing and to constitute a dark chamber, said casing receiving therein a demand meter, a counter and a clock mechanism together with means for automatically rewinding the clock mechanism, a film strip adapted to receive impressions of the meter and counter, means for periodically lighting the chamber and thereby effecting an exposure, and means for automatically advancing the film periodically.

7. In a photographic apparatus, a chamber adapted to receive the meter or other part to be read and the photographic apparatus, said chamber having three openings, closures 5, 6, 7 for said openings, a single closure holding means 11 and means to secure said closure means against tampering.

8. In a photographic apparatus, a casing or chamber adapted to serve as a dark chamber, and to be positioned about a meter to be photographed, photographic apparatus within said chamber, the latter having closures adapted to be sealed and by which access may be accorded to the interior of the chamber only by unsealing the same, and extraneous means manipulative by a person having authority, adapted to cause an additional exposure without unsealing the chamber by presenting an unexposed area to the meter to receive a photographic impression upon said unexposed area.

9. In a photographic apparatus, a casing or chamber adapted to serve as a dark chamber, and to be positioned about a meter to be photographed, and photographic apparatus within said chamber, the latter having closures adapted to be sealed and by which access may be accorded to the interior of the chamber only by unsealing the same, said casing having in a wall thereof provisions permitting the insertion of a switch key to cause the functioning of the photographic apparatus and means operable by said switch key to present an additional unexposed area.

10. In a photographic apparatus, a casing having an opening through which a sensitized film or strip may be inserted, and a closure for said opening, the said closure having mounted thereon circuit closing provisions forming part of an electric circuit through which a circuit may be completed, and with which circuit closing provisions the strip may make contact in its travel.

11. In a photographic apparatus, a casing having an opening through which a sensitized film or strip may be inserted, and a closure for said opening, said closure having a roll 36 carried thereby and forming part of an electric circuit and along the surface whereof the film is adapted to travel, and means for making contact during the travel of said strip.

12. In a photographic apparatus having a casing adapted to be closed and secured against tampering, a key or like member adapted to be inserted into a wall of the casing for the purpose of causing the photographic apparatus to function and means within the casing to be engaged by said key for operating the photographic apparatus.

13. In a photographic apparatus having a casing adapted to be closed and secured against tampering, a key or like member adapted to be inserted into a wall of the casing and which upon insertion causes the photographic apparatus to function, means to support a sensitized element and means periodically to cause exposures thereon and a key adapted to be inserted in a wall of said casing and thereupon to function to cause an additional exposure by causing the feeding of the sensitized elements.

14. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; providing through the agency of the sensitized strip for indication that the first sensitized area of the strip is in position for receiving its exposure; periodically presenting to said meter reading an unexposed sensitive surface; periodically lighting the dark chamber to make the exposure upon said sensitive surface, sequentially marking said exposed surface at substantially the time of making the exposure; presenting another unexposed sensitive surface and repeating the preceding sequence of operations at substantial intervals until a series of sequential photographic records has been automatically made within said dark chamber; all while the same and the meter and said photographic apparatus have continued enclosed against tampering.

15. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; periodically presenting to said meter reading an unexposed sensitive surface; periodically lighting the dark chamber to make the exposure upon said sensitive surface; marking date indications upon said exposed surface at substantially the time of making the exposure; presenting another unexposed sensitive surface and repeating the preceding sequence of operations at substantial intervals until a series of sequential photographic records has been automatically made within said dark chamber; providing for the presentation, at an unannounced interval, of an additional unexposed sensitive surface by an authorized person; all while the same and the meter and said photographic apparatus have continued enclosed against tampering.

16. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; causing the strip which has the sensitized surface to signal that it is in position for receiving the first exposure, periodically automatically presenting to said meter reading an unexposed sensitive surface, periodically lighting the dark chamber to make the exposure upon said sensitive surface; marking date indications upon said exposed surface at substantially the time of making the exposure; automatically presenting another unexposed sensitive surface and automatically repeating the preceding sequence of operations at substantial intervals until a series of sequential photographic records has been automatically made within said dark chamber; all while the same and the meter and said photographic apparatus have continued enclosed against tampering; and automatically rewinding or resetting the parts for a new series of operations.

17. That method of making photographic records of meter and like readings or indications, and preventing tampering with the meter, its readings and/or the said photographic records, which comprises the following steps; sufficiently enclosing together against tampering the meter and photograph apparatus to constitute or provide a dark chamber with said apparatus in record making condition; periodically presenting to said meter reading an unexposed sensitive surface; periodically lighting the dark chamber to make the exposure upon said sensitive surface; presenting another unexposed sensitive surface and repeating the preceding sequence of operations at substantial intervals until a series of sequential photographic records has been automatically made within said dark chamber; providing for the presentation, at an unannounced interval, of an additional unexposed sensitive surface by an authorized person; all while the same and the meter and said photographic apparatus have continued enclosed against tampering.

18. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; periodically presenting to said meter reading an unexposed sensitive surface; preventing exposure of said sensitive surface only by preserving the darkness of said chamber whereby tampering would be detected at any time; periodically lighting the dark chamber to make the exposure upon said sensitive surface; marking date indications upon said exposed surface at substantially the time of making the exposure; presenting another unexposed sensitive surface and daily repeating the preceding sequence of operations until a desired series of sequential photographic records has been automatically made within the dark chamber, all while the meter and the said photographic apparatus have continued enclosed against tampering.

19. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; periodically presenting to said meter reading an unexposed sensitive surface; periodically lighting the dark chamber to make the exposure upon said sensitive surface; dating or marking said exposed surface at substantially the time of making the exposure; presenting another unexposed sensitive surface and daily repeating the preceding sequence of operations until a desired series of sequential photographic records has been automatically made within the dark chamber; providing for the presentation at an unannounced interval of an additional unexposed sensitive surface by an authorized person; all while the meter and the said photographic apparatus have continued enclosed against tampering.

20. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; periodically presenting to said meter reading an unexposed sensitive surface; preventing exposure of said sensitive surface only by preserving the darkness of said chamber whereby tampering would be detected at any time; periodically lighting the dark chamber to make the exposure upon said sensitive surface; marking date indications upon said exposed surface at substantially the time of making the exposure; presenting another unexposed sensitive surface and at intervals for a month repeating the preceding sequence of operations at substantial intervals until a monthly series of sequential photographic records has been automatically made within the dark chamber, all while the meter and the said photographic apparatus have continued enclosed against tampering.

21. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; periodically presenting to said meter reading an unexposed sensitive surface; periodically lighting the dark chamber to make the exposure upon said sensitive surface; sequentially marking said exposed surface at substantially the time of making the exposure, presenting another unexposed sensitive surface and repeating the preceding sequence of operations at substantial intervals until a series of sequential photographic records has been automatically made within said dark chamber; providing for the presentation at an unannounced interval of an additional unexposed sensitive surface by an authorized person; all while the same and the meter and said photographic apparatus have continued enclosed against tampering.

22. That method of making photographic records of meter and like readings or indications, and preventing tampering with the meter, its readings and/or said photographic records, which comprises the following steps; sufficiently enclosing together against tampering the meter and photograph apparatus to constitute or provide a dark chamber with said apparatus in record making condition; sealing the enclosure for the period required for the entire series of sequential exposure; periodically presenting to said meter reading an unexposed sensitive surface; periodically lighting the dark chamber to make the exposure upon said sensitive surface; presenting another unexposed sensitive surface and repeating the preceding sequence of operations at substantial intervals until a series of sequential photographic records has been automatically made within said dark chamber; providing for the presentation at an unannounced interval of an additional unexposed sensitive surface by an authorized person; all while the same and the meter and said photographic apparatus have continued enclosed against tampering, and unsealing the enclosure at the end of said period.

23. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; causing a sensitized strip to signal that it is positioned for the first exposure; feeding said sensitized strip periodically within said enclosure; thereby presenting periodically an exposure area of said strip to the said meter readings; preventing exposure of said sensitive surface only by preserving the darkness of said chamber whereby tampering would be detected at any time; periodically lighting the dark chamber to make an exposure upon an exposure area of said sensitized strip; sequentially marking the exposure areas at substantially the time of making the corresponding exposure; repeating the sequence of operations at substantial intervals until a series of sequential photographic records has been automatically made within the dark chamber; all while the same and the meter and the said photographic apparatus have continued enclosed against tampering.

24. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; feeding a sensitized strip periodically within said enclosure, thereby presenting periodically an exposure area of said strip to the said meter readings; periodically lighting the dark chamber to make an exposure upon an exposure area of said sensitized strip; sequentially marking the exposure areas at substantially the time of making the corresponding exposure; repeating the sequence of operations at substantial intervals until a series of sequential photographic records has been automatically made within the dark chamber; providing for the presentation at an unannounced interval of an additional unexposed sensitive surface by an authorized person; all while the same and the meter and the said photographic apparatus have continued enclosed against tampering.

25. That method of making photographic records of meter and like readings or indications, and preventing tampering with the meter, its readings and/or the said photographic records, which comprises the following steps: sufficiently enclosing together against tampering the meter and photograph apparatus to constitute or provide a dark chamber with said apparatus in record making condition; periodically presenting to said meter reading an unexposed sensitive surface; periodically lighting the dark chamber; presenting another unexposed sensitive surface and repeating the preceding sequence of operations at substantial intervals until a series of sequential photographic records has been automatically made within said dark chamber; providing for the presentation at an unannounced interval of an additional unexposed sensitive surface by an authorized person; all while the same and the meter and said photographic apparatus have continued enclosed against tampering.

26. A mechanical assembly for making photographic records of meter and like readings or indications, and for preventing tampering with the meter, its readings and/or the said photographic records, which includes the following:

a meter which presents readings or indications; a photographic apparatus including a lens; a casing or enclosure for the photographic apparatus and meter, providing a dark chamber; lighting means within the chamber; means to support within the casing or enclosure a sensitive surface of sufficient extent to provide a series of exposure areas; means for sequentially marking said exposure surface at substantially the time of making each exposure; means automatically to present periodically a fresh area of said sensitive surface; and means periodically to cause said lighting means to function.

27. A mechanical assembly for making photographic records of meter and like readings or indications, and for preventing tampering with the meter, its readings and/or the said photographic records, which includes the following: a meter which automatically presents readings or indications; a photographic apparatus including a lens; a casing or enclosure for the photographic apparatus and meter providing a dark chamber; automatic lighting means within the chamber; means to support within the casing or enclosure a sensitive surface of sufficient extent to provide a series of exposure areas; means automatically to present periodically a fresh area of said sensitive surface; automatic means periodically to cause said lighting means to function; and means automatically to rewind or reset the parts for a new series of operations.

28. A mechanical assembly for making photographic records of meter and like readings or indications and for preventing tampering with the meter, its readings and/or the said photographic records, which includes the following: a meter which presents readings or indications; a photographic apparatus including a lens; a casing or enclosure for the photographic apparatus and meter providing a dark chamber; lighting means within the chamber; means to support within the casing or enclosure a sensitive surface of sufficient extent to provide a series of exposure areas; means automatically to present periodically a fresh area of said sensitive surface; means periodically to cause said lighting means to function; and means to provide for the presentation at an unannounced interval of an additional unexposed sensitive surface by an authorized person.

29. A mechanical assembly for making photographic records of meter and like readings or indications and for preventing tampering with the meter, its readings and/or the said photographic records, which includes the following: a meter which presents readings or indications; a photographic apparatus including a lens; a casing or enclosure for the photographic apparatus and meter providing a dark chamber; lighting means within the chamber; means to support within the casing or enclosure a sensitive surface of sufficient extent to provide a series of exposure areas; means for sequentially marking said exposure surface at substantially the time of making each exposure; means automatically to present periodically a fresh area of said sensitive surface; means periodically to cause said lighting means to function; and means to mark sequentially each exposure area of said sensitive surface 30. A mechanical assembly for making photographic records of meter and like readings or indications and for preventing tampering with the meter, its readings and/or the said photographic records, which includes the following: a meter which presents readings or indications; a photographic apparatus including a lens; a casing or enclosure for the photographic apparatus and meter, providing a dark chamber; lighting means within the chamber; means to support within the casing or enclosure a sensitive surface of sufficient extent to provide a series of exposure areas; means automatically to present periodically a fresh area of said sensitive surface; means periodically to cause said lighting means to function; means to mark sequentially each exposure area of said sensitive surface; and means to provide for the presentation at an unannounced interval of an additional unexposed sensitive surface by an authorized person.

31. A mechanical assembly for making photographic records of meter and like readings or indications, and for preventing tampering with the meter, its readings and/or the said photographic records, which includes the following: a meter which automatically presents readings or indications; a photographic apparatus including a lens; a casing or enclosure for the photographic apparatus and meter providing a dark chamber; automatic lighting means within the chamber; means to support within the casing or enclosure a sensitive surface of sufficient extent to provide a series of exposure areas; means automatically to present periodically a fresh area of said sensitive surface, automatic means periodically to cause said lighting means to function; automatic means sequentially to mark each exposure area of said sensitive surface; and means automatically to rewind or reset the parts for a new series of operations.

32. A mechanical assembly for making photographic records of meter and like readings or indications, and for preventing tampering with the meter, its readings and/or the said photographic records, which includes the following: a meter which presents readings or indications; a photographic apparatus including a lens; a casing or enclosure for the photographic apparatus and meter providing a dark chamber; lighting means within the chamber; means to support within the casing or enclosure a sensitive surface of sufficient extent to provide a series of exposure areas; means automatically to present periodically a fresh area of said sensitive surface; means periodically to cause said lighting means to function; means to provide a date indication upon each exposure area of said sensitive surface; and means to provide for the presentation at an unannounced interval of an additional unexposed sensitive surface by an authorized person.

33. A mechanical assembly for making photographic records of meter and like readings or indications, and for preventing tampering with the meter, its readings and/or the said photographic records, which includes the following: a meter which automatically presents readings or indications; a photographic apparatus including a lens; a casing or enclosure for the photographic apparatus and meter providing a dark chamber; automatic lighting means within the chamber; means to support within the casing or enclosure a sensitive surface of sufficient extent to provide a series of exposure areas; means automatically to present periodically a fresh area of said sensitive surface; automatic means periodically to cause said lighting means to function; automatic means to provide a date indication upon each exposure area of said sensitive surface; and means automatically to rewind or reset the parts for a new series of operations.

34. A mechanical assembly for making photographic records of meter and like readings or indications and for preventing tampering with the meter, its reading and/or the said photographic records, which includes the following: a meter which presents readings or indications; a photographic apparatus including a lens; a casing or enclosure for the photographic apparatus and meter, providing a dark chamber; a clock or time-control device; lighting means within the chamber; means to support within the casing or enclosure a sensitive surface of sufficient extent to provide a series of exposure areas; means automatically to present periodically a fresh area of said sensitive surface; means periodically to cause said lighting means to function; and means to provide for the presentation at an unannounced interval of an additional unexposed sensitive surface by an authorized person.

35. A mechanical assembly for making photographic records of meter and like readings or indications and for preventing tampering with the meter, its readings and/or the said photographic records, which includes the following: a meter which automatically presents readings or indications; a photographic apparatus including a lens; a casing or enclosure for the photographic apparatus and meter providing a dark chamber; a clock or time-control device; automatic lighting means within the chamber; means to support within the casing or enclosure a sensitive surface of sufficient extent to provide a series of exposure areas; means automatically to present periodically a fresh area of said sensitive surface; automatic means periodically to cause said lighting means to function; and means automatically to rewind or reset the parts for a new series of operations.

36. A mechanical assembly for making photographic records of meter and like readings or indications and for preventing tampering with the meters, its readings and/or the said photographic records, which includes the following: a meter which presents readings or indications; a photographic apparatus including a lens; a casing or enclosure for the photographic apparatus and meter providing a dark chamber; lighting means within the chamber; means to support within the casing or enclosure a sensitive surface of sufficient extent to provide a series of exposure areas; a cycle member having provisions to control the periodic functioning of the lighting means and the periodic presentation of an exposure area of said sensitive surface; and means to provide for the presentation at an unannounced interval of an additional unexposed sensitive surface by an authorized person.

37. A mechanical assembly for making photographic records of meter and like readings or indications and for preventing tampering with the meter, its readings and/or the said photographic records, which includes the following: a meter which automatically presents readings or indications; a photographic apparatus including a lens; a casing or enclosure for the photographic apparatus and meter providing a dark chamber; automatic lighting means within the chamber; means to support within the casing or enclosure a sensitive surface of sufficient extent to provide a series of exposure areas; a cycle member having provision to control the periodic functioning of the lighting means and the periodic presentation of an exposure area of said sensitive surface; and means automatically to rewind or reset the parts for a new series of operations.

38. A mechanical assembly for making photographic records of meter and like readings or indications, and for preventing tampering with the meter, its readings and/or the said photographic records, which includes the following: a meter which presents readings or indications; a photographic apparatus including a lens; a casing or enclosure for the photographic apparatus and meter providing a dark chamber; lighting means within the chamber; means to support within the casing or enclosure a sensitive surface of sufficient extent to provide a series of exposure areas; a cycle member having provision to control the periodic functioning of the lighting means and the periodic presentation of an exposure area of said sensitive surface; sequential marking means for marking each exposure at substantially the time of making the same, said marking means being controlled by said cycle member; and means to prevent exposure of said sensitive surface only by preserving the darkness of said chamber whereby tampering would be detected at any time.

39. A mechanical assembly for making photographic records of meter and like readings or indications, and for preventing tampering with the meter, its readings and/or the said photographic records, which includes the following: a meter which presents readings or indications; a photographic apparatus including a lens; a casing or enclosure for the photographic apparatus and meter providing a dark chamber; lighting means within the chamber; means to support a sensitized film within said chamber; a cycle member having provision to control the feeding of said sensitized film and the periodic functioning of said lighting means; and means to provide for the presentation at an unannounced interval of an additional unexposed sensitive surface by an authorized person.

40. A mechanical assembly for making photographic records of meter and like readings or indications and for preventing tampering with the meter, its readings and/or the said photographic records, which includes the following: a meter which automatically presents readings or indications; a photographic apparatus including a lens; a casing or enclosure for the photographic apparatus and meter providing a dark chamber; automatic lighting means within the chamber; a cycle member having provisions to control the feeding of said sensitized film and the periodic functioning of said lighting means; and means automatically to rewind or reset the parts for a new series of operations.

41. A mechanical assembly for making photographic records of meter and like readings or indications and for preventing tampering with the meter, its readings and/or the said photographic records, which includes the following: a meter which presents readings or indications; a photographic apparatus including a lens; a casing or enclosure for the photographic apparatus and meter providing a dark chamber; lighting means within the chamber; means to support a sensitized film within said chamber; a cycle member having provisions to control the feeding of said sensitized film and the periodic functioning of said lighting means; means to provide date indication upon each exposure area of said sensitized film and means whereby said dating is governed by said cycle member; and means to provide for the presentation of an additional unexposed sensitive surface by an authorized person at an unannounced interval.

42. A mechanical assembly for making photographic records of meter and like readings or indications and for preventing tampering with the meter, its readings and/or the said photographic records, which includes the following: a photographic apparatus including a lens, a casing adapted to enclose together the said photographic apparatus and also the meter whose readings or indications are to be photographed, whereby a dark chamber is provided therefor; lighting means within said chamber; means to support within the casing a sensitive surface of sufficient extent to provide a series of exposure areas; governing means to cause said lighting means periodically to function and to cause the successive presentation of exposure areas; and means to provide for the presentation at an unannounced interval of an additional unexposed sensitive surface by an authorized person.

43. A mechanical assembly for making photographic records of meter and like readings or indications, and for preventing tampering with the meter, its reading and/or the said photographic records, which includes the following: a photographic apparatus including a lens, a casing adapted to enclose together the said photographic apparatus and also the meter whose readings or indications are to be photographed, whereby a dark chamber is provided therefor; means to support within the casing a sensitized strip of sufficient length to provide a series of exposure areas and means automatically to present a fresh area of said sensitized surface so that the said series of exposure areas may be automatically presented; and automatic means cooperating therewith to cause the exposures to occur sequentially; and means to provide for the presentation at an unannounced interval of an additional unexposed sensitive surface by an authorized person.

44. In a photographic apparatus, a casing or chamber adapted to serve as a dark chamber and to be positioned about a meter to be photographed; photographic apparatus within the chamber, said chamber having a closure; means for sealing said closure so that access may be afforded to the interior of the chamber only by unsealing the closure; said casing having in the outer wall thereof provisions permitting the insertion of a switch key; and means adapted to be engaged by the switch key to govern the functioning of the photographic apparatus.

45. In a photographic apparatus, a casing or chamber adapted to serve as a dark chamber and to be positioned about a meter to be photographed, photographic apparatus within said chamber and including a sensitized film and means to feed the same; said chamber having a closure, means to seal said closure, whereby the chamber can be opened only by unsealing the closure, the exterior wall of said casing having provisions for receiving a switch key which, when inserted, is adapted to cause the feeding of the film to provide an extra exposure.

46. In a photographic apparatus, a casing or chamber adapted to serve as a dark chamber and to be positioned about a meter to be photographed; photographic apparatus within the chamber and including a sensitized film and means to feed the same; a closure for said chamber; means to seal said closure; said casing having provisions permitting the insertion of a switch key and provisions whereby the insertion of a switch key causes the feeding of the photographic strip to the extent of one exposure area.

WILLIAM H. PETIT.
EDSON S. HINELINE.